Sept. 16, 1924.  
P. J. SCHOENHOFF  
CUSHION SEAT  
Filed Feb. 16, 1923  
1,508,859

Patented Sept. 16, 1924.

1,508,859

UNITED STATES PATENT OFFICE.

PETER J. SCHOENHOFF, OF PLAINS, KANSAS.

CUSHION SEAT.

Application filed February 16, 1923. Serial No. 619,437.

*To all whom it may concern:*

Be it known that I, PETER J. SCHOEN-HOFF, a citizen of the United States, residing at Plains, in the county of Meade and State of Kansas, have invented certain new and useful Improvements in Cushion Seats, of which the following is a specification.

This invention relates to an improvement in seat structures which are particularly adapted for use on vehicles such as tractors and other farming implements.

At the present time, as far as I am aware, all seats for tractors and other farming implements are formed entirely of iron and consequently the continuous use of such a seat for periods of several hours duration each becomes very tiresome and uncomfortable. This is especially true when riding over bumps, rocks or hollows. Furthermore, there is no provision to assist one in maintaining his position on the seat when the latter becomes severely jolted on account of passage over extremely rough ground. Neither is there any provision to support one's back during these long periods of operation.

Therefore, a principal object of my invention is to provide a driver's or operator's seat structure for use on tractors and the like which will give ease and comfort to the user especially during long periods of operation and while riding over uneven ground.

Another object of my invention is to provide a seat of the character described with yieldably supported side arms which will move with the body of the person occupying the seat when going over hilly soil thereby providing a more comfortable body support.

A further object of the invention is to provide a seat structure of the character described with a yieldable back, whereby the user will be relieved from fatigue when operating the tractor or the like during long periods of time.

In the drawings, which show one form of my invention,

Figure 1:
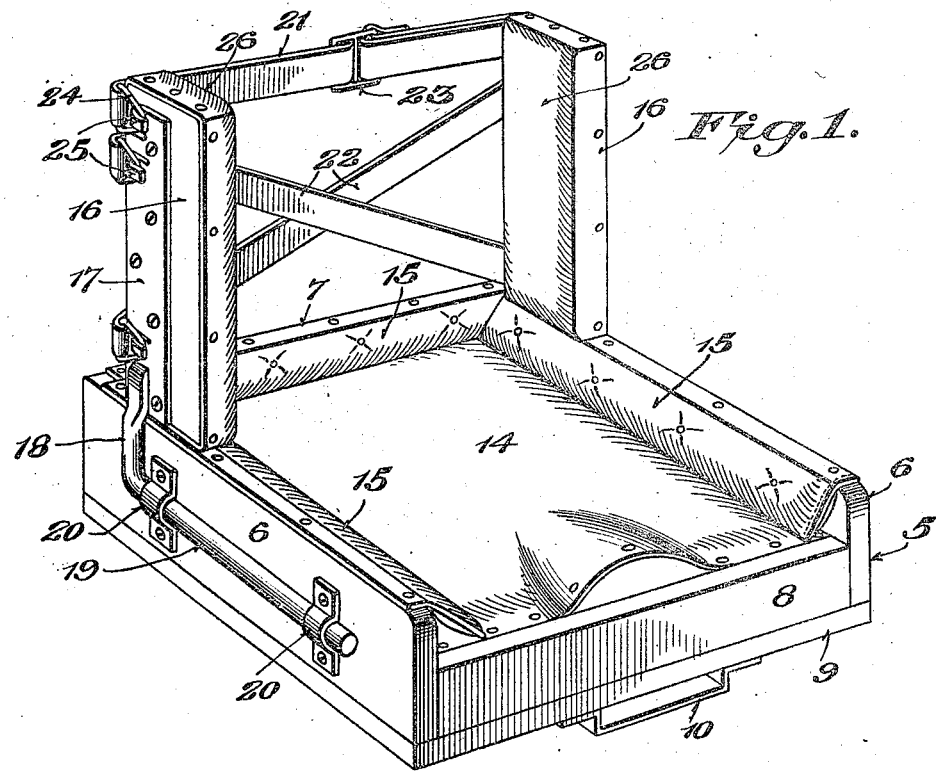
Figure 1 is a perspective view of the seat structure.
Figure 2:
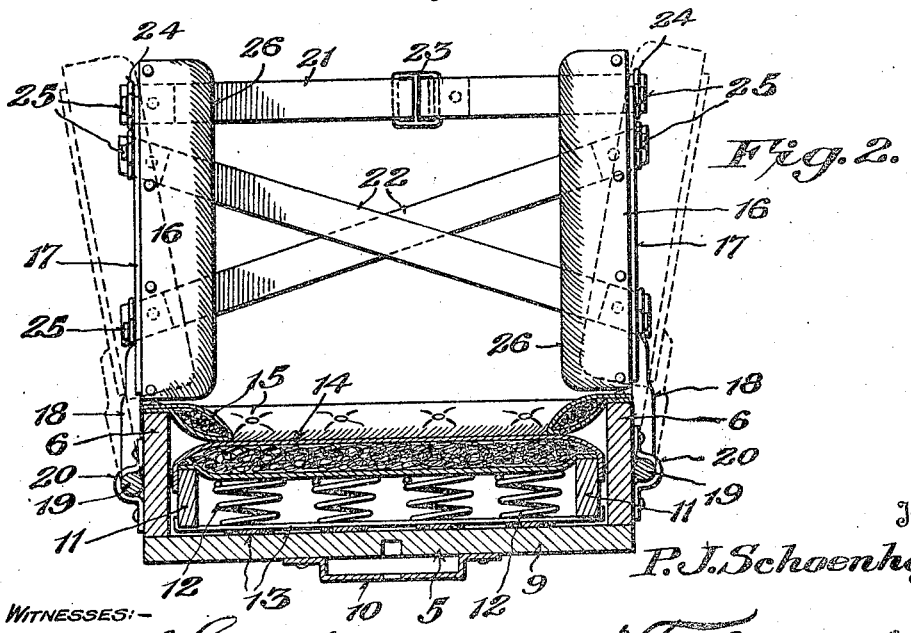
Figure 2 is a front elevation thereof, showing a transverse section of the supporting seat.

In carrying the invention into effect it is proposed to provide a construction which may be readily made of wood or metal to meet manufacturing requirements, and to also provide a device which may be readily attached to present agricultural apparatus and tractors to take the place of the seats now almost universally employed and which as previously indicated, do not afford adequate comfort to the occupant of the seat.

Referring to the drawing, my invention comprises a supporting seat, which is designated as a whole by the reference numeral 5. This supporting seat preferably includes a supporting box consisting of side walls 6—6, a rear wall 7, a front wall 8 and a bottom 9. Secured to the bottom 9 is a strap 10, by means of which the supporting seat may be secured in the regular manner to the ordinary spring tongue now generally employed on tractors and other farming implements. Detachably supported within the box is a spring seat consisting of a frame 11, a plurality of coil springs 12, a plurality of cross strips 13 connected to the lower edges of the frame for supporting the springs, and an upholstered cushion supported by the springs and having its edges fixed to the frame. The front wall 8 is of less height than the side and rear walls of the box, and the upper surface of the cushion 14 lies in substantially the same plane as the upper edge of the front wall 8. A plurality of upholstery strips 15 respectively have their longitudinal edges secured to the upper edges of the side and rear walls of the box, and these strips extend inwardly and overlap the adjacent outer edges of the cushion 14. The spring seat may be readily removed from the supporting box by lifting up the front end of the seat and then drawing the same forwardly over the front wall 8 of the box, the strips 15 swinging upwardly as a result of such movement of the seat.

In order to provide yieldable side supports, I employ upwardly extending side arms 16—16, which are loosely connected at their lower ends to the supporting box so as to swing outwardly relative to one another, and I associate yieldable means with said side arms, whereby the latter are yieldably retained against outward movements. To this end, each arm is provided on its outer face with a plate 17, which is fixedly secured at its lower end to a rock arm 18, fixed to a rock shaft 19, disposed in a horizontal plane and detachably engaged in bearing brackets 20—20 secured to the adjacent side wall 6 of the box. The rock shaft 19 is positioned below the upper edge of the side wall 6 and the rock arm 18 extends upwardly and normally bears against the side walls to form a stop and thereby limit the inward movement of the side arm connected therewith. The side arms are connected by an elastic back, which, in this instance, comprises an upper strap 21 and lower cross straps 22—22, each strap being provided with a buckle 23 for adjusting the lengths of the straps in order to conform to the size of the user. The ends of the straps are respectively provided with loops 24 for engagements with hooks 25 stamped from the plates 17, thus providing means for detachably connecting the elastic back with the side arms.

The inner face of each side arm 16 is covered by upholstery 26.

From the foregoing, it will be observed that I have provided a supporting seat with a pair of upwardly extending detachable side arms, which are loosely connected to the seat for outward swinging movements, and means for yieldably retaining said side arms against said outward swinging movements, thus permitting either arm to give when lateral movement is imparted to the user while passing over extremely rough ground.

Without further description it is thought that the features and advantages of the improvements will be readily apparent, and it will be understood that changes in the form, proportion and minor details of construction may be made without departing from the spirit of the invention.

I claim:—

1. In a seat structure, the combination with a supporting seat, of a pair of upwardly extending side arms respectively connected to said seat to swing outwardly about horizontal pivots, a yieldable back for said seat connected to said side arms, and an elastic connection between said side arms constituting both a yieldable back for the seat and means for permitting outward swinging movement of either side arm relative to the other.

2. A construction of the class described including a supporting seat, upwardly extending arm members pivotally connected at their lower ends to the sides of the seat, and means for yieldingly maintaining the side arms in an upright position said means constituting a back for the seat.

3. In a seat structure, the combination with a supporting seat, of a pair of upwardly extending side arms connected to the seat by horizontal pivots, and means for yieldably retaining said arms against outward swinging movements, each of said pivotal connections including a rock-shaft journaled in the outer side face of the supporting seat and having a rock-arm fixed to the adjacent side arm, said rock-arm normally engaging said outer face of the supporting seat to limit the inward movement of said side arm.

In testimony whereof I hereunto affix my signature in the presence of two witnesses.

PETER J. SCHOENHOFF.

Witnesses:
HENRY KRAUSE,
PETER P. SCHOENHOFF.